United States Patent
Lee et al.

(10) Patent No.: US 11,382,012 B2
(45) Date of Patent: Jul. 5, 2022

(54) METHOD AND APPARATUS FOR DEPRIORITIZING ACCESS ON UNLICENSED BAND BASED ON UE PREFERENCE IN WIRELESS COMMUNICATION SYSTEM

(71) Applicant: LG ELECTRONICS INC., Seoul (KR)

(72) Inventors: Yejee Lee, Seoul (KR); Sangwon Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/979,496

(22) PCT Filed: May 7, 2019

(86) PCT No.: PCT/KR2019/005419
§ 371 (c)(1),
(2) Date: Sep. 9, 2020

(87) PCT Pub. No.: WO2019/216618
PCT Pub. Date: Nov. 14, 2019

(65) Prior Publication Data
US 2021/0022056 A1  Jan. 21, 2021

(30) Foreign Application Priority Data
May 10, 2018 (KR) .................. 10-2018-0053654

(51) Int. Cl.
*H04W 36/04* (2009.01)
*H04W 76/27* (2018.01)
(Continued)

(52) U.S. Cl.
CPC ........... *H04W 36/04* (2013.01); *H04W 16/24* (2013.01); *H04W 48/20* (2013.01); *H04W 74/0808* (2013.01); *H04W 76/27* (2018.02)

(58) Field of Classification Search
CPC ..... H04W 16/00; H04W 16/14; H04W 16/24; H04W 16/32; H04W 36/03; H04W 36/04;
(Continued)

(56) References Cited

U.S. PATENT DOCUMENTS 10,716,047 B2 *  7/2020  Meylan ................. H04W 48/16
11,160,006 B2 * 10/2021  Zaus ....................... H04W 8/02
(Continued)

FOREIGN PATENT DOCUMENTS

WO         2016/003224         1/2016

OTHER PUBLICATIONS

PCT International Application No. PCT/KR2019/005419, International Search Report dated Aug. 6, 2019, 2 pages.
(Continued)

*Primary Examiner* — Jean A Gelin
(74) *Attorney, Agent, or Firm* — Lee Hong Degerman Kang Waimey

(57) ABSTRACT

A method and apparatus for deprioritizing access on an unlicensed band based on user equipment (UE) preference in a wireless communication system is provided. A wireless device attempts to access a cell on an unlicensed frequency and starts a timer. When the timer expires, if the wireless device is a licensed preferred wireless device, the wireless device deprioritizes the unlicensed frequency. If the wireless device is an unlicensed preferred wireless device, the wireless device deprioritizes only the cell. The wireless device performs a cell reselection according to the de-prioritization.

8 Claims, 10 Drawing Sheets

(51) Int. Cl.
*H04W 16/24* (2009.01)
*H04W 48/20* (2009.01)
*H04W 74/08* (2009.01)

(58) Field of Classification Search
CPC ..... H04W 36/06; H04W 36/10; H04W 36/16; H04W 48/16; H04W 48/20; H04W 48/02; H04W 48/18; H04W 72/14; H04W 72/0453; H04W 76/11; H04W 76/25; H04W 76/27
See application file for complete search history.

(56) References Cited

U.S. PATENT DOCUMENTS

| | | | | |
|---|---|---|---|---|
| 2013/0337821 | A1* | 12/2013 | Clegg | H04W 24/08 455/452.1 |
| 2016/0095110 | A1* | 3/2016 | Li | H04W 72/1215 370/329 |
| 2016/0227571 | A1* | 8/2016 | Baek | H04W 48/20 |
| 2016/0262118 | A1* | 9/2016 | Kim | H04W 52/365 |
| 2016/0381600 | A1 | 12/2016 | Aksu | |
| 2017/0086172 | A1* | 3/2017 | Dinan | H04W 72/042 |
| 2017/0238221 | A1 | 8/2017 | Santhanam et al. | |
| 2018/0027493 | A1* | 1/2018 | Li | H04W 52/0216 370/280 |
| 2018/0192365 | A1* | 7/2018 | Feng | H04W 48/20 |
| 2018/0343639 | A1* | 11/2018 | Zheng | H04W 48/16 |
| 2019/0349969 | A1* | 11/2019 | Chakraborty | H04W 56/0015 |
| 2020/0045589 | A1* | 2/2020 | Heden | H04W 48/12 |
| 2020/0221372 | A1* | 7/2020 | Shih | H04W 48/16 |
| 2020/0359286 | A1* | 11/2020 | Tang | H04W 36/06 |

OTHER PUBLICATIONS

3GPP; TSGRAN; E-UTRA; User Equipment (UE) procedures in idle mode (Release 14), 3GPP TS 36.304, V14.6.0 (Mar. 2018), Apr. 2, 2018, 52 pages.

* cited by examiner

METHOD AND APPARATUS FOR DEPRIORITIZING ACCESS ON UNLICENSED BAND BASED ON UE PREFERENCE IN WIRELESS COMMUNICATION SYSTEM

CROSS-REFERENCE TO RELATED APPLICATIONS

This application is the National Stage filing under 35 U.S.C. 371 of International Application No. PCT/KR2019/005419, filed on May 7, 2019, which claims the benefit of earlier filing date and right of priority to Korean Application No. 10-2018-0053654, filed on May 10, 2018, the contents of which are all hereby incorporated by reference herein in their entirety.

TECHNICAL FIELD

The present invention relates to wireless communications, and more particularly, to a method and apparatus for deprioritizing access on an unlicensed band based on user equipment (UE) preference in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Carrier aggregation with at least one secondary cell (SCell) operating in the unlicensed spectrum is referred to as licensed-assisted access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells.

LAA eNodeB (eNB) and user equipment (UE) apply listen-before-talk (LBT) before performing a transmission on LAA SCell. When LBT is applied, the transmitter listens to/senses the channel to determine whether the channel is free or busy. If the channel is determined to be free, the transmitter may perform the transmission. Otherwise, it does not perform the transmission. If an LAA eNB uses channel access signals of other technologies for the purpose of LAA channel access, it shall continue to meet the LAA maximum energy detection threshold requirement.

SUMMARY

NR standalone operation on unlicensed bands is being discussed. Therefore, a method for supporting NR standalone operation on unlicensed bands efficiently is required. Specifically, since a cell on the unlicensed bands can be configured as a primary cell (PCell) in the NR standalone operation on unlicensed bands, initial access and/or random access procedure should be performed on the unlicensed bands. In this case, LBT failure may impact the initial access and/or random access procedure.

In an aspect, a method performed by a wireless device in a wireless communication system is provided. The method includes attempting to access a cell on an unlicensed frequency and starting a timer, when the timer expires, if the wireless device is a licensed preferred wireless device, deprioritizing the unlicensed frequency, if the wireless device is an unlicensed preferred wireless device, deprioritizing the cell, and performing a cell reselection.

In another aspect, a wireless device in a wireless communication system is provided. The wireless device includes a memory, a transceiver, and a processor, operably coupled to the memory and the transceiver, and configured to attempt to access a cell on an unlicensed frequency and start a timer, when the timer expires, if the wireless device is a licensed preferred wireless device, deprioritize the unlicensed frequency, if the wireless device is an unlicensed preferred wireless device, deprioritize the cell, and perform a cell reselection.

In another aspect, a processor for a wireless device in a wireless communication system is provided. The processor is configured to attempt to access a cell on an unlicensed frequency and start a timer, when the timer expires, if the wireless device is a licensed preferred wireless device, deprioritize the unlicensed frequency, if the wireless device is an unlicensed preferred wireless device, deprioritize the cell, and perform a cell reselection.

UE preference on the unlicensed frequency and/or licensed frequency can be considered for cell reselection.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
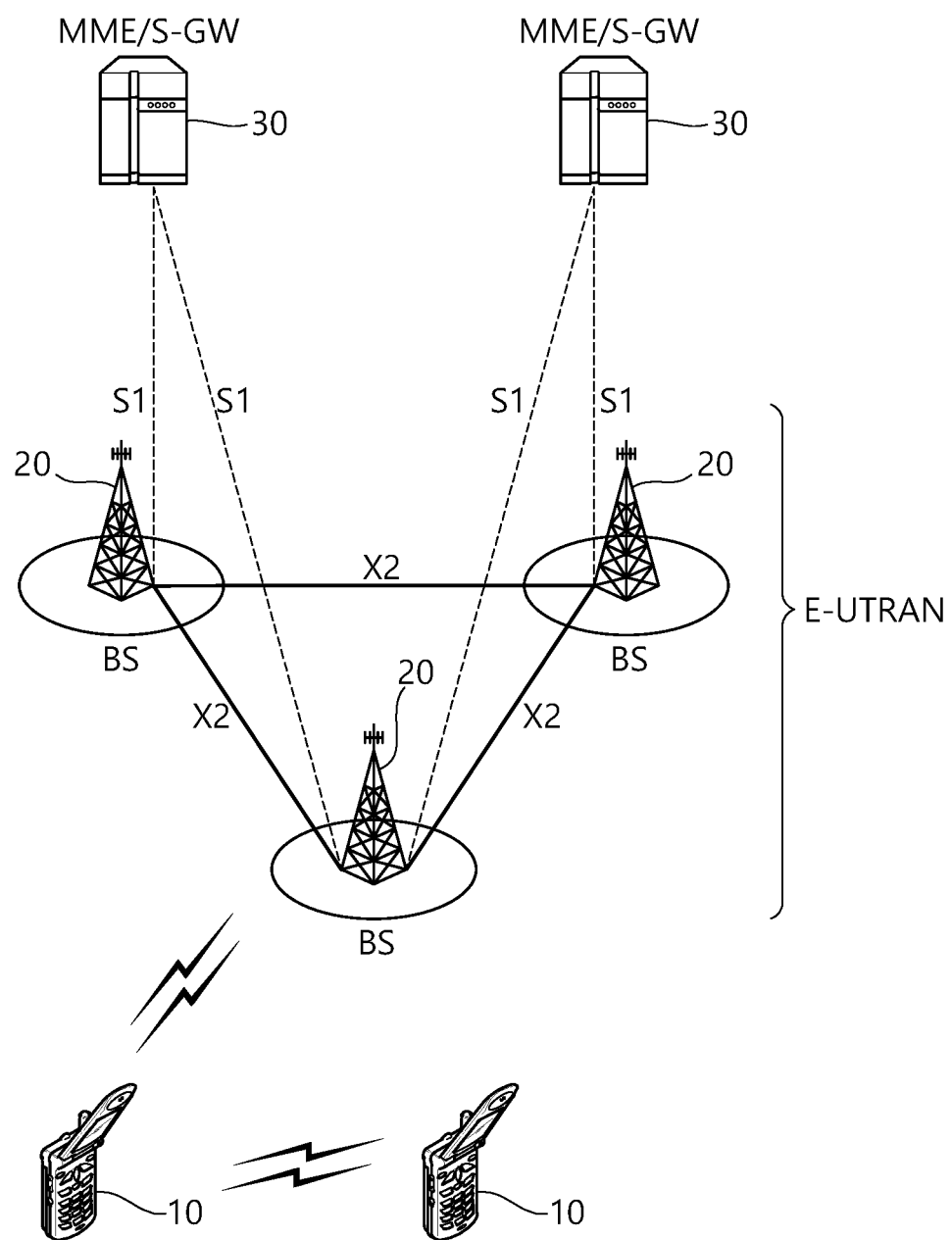
FIG. 1 shows an example of a wireless communication system to which the technical features of the present invention can be applied.

FIG. 1 shows an example of a wireless communication system to which the technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
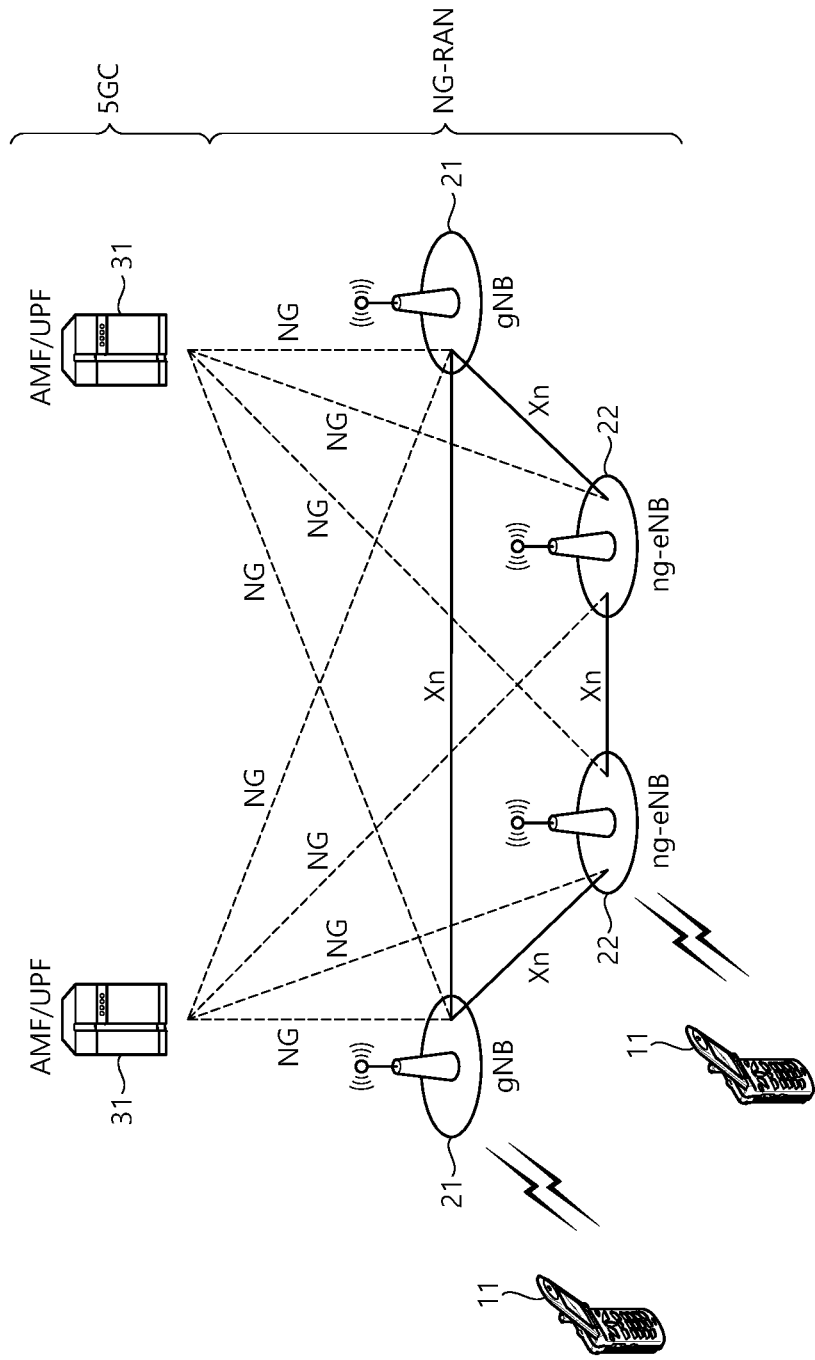
FIG. 2 shows another example of a wireless communication system to which the technical features of the present invention can be applied.

FIG. 2 shows another example of a wireless communication system to which the technical features of the present invention can be applied. Specifically, FIG. 2 shows a system architecture based on a 5G new radio access technology (NR) system. The entity used in the 5G NR system (hereinafter, simply referred to as "NW") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
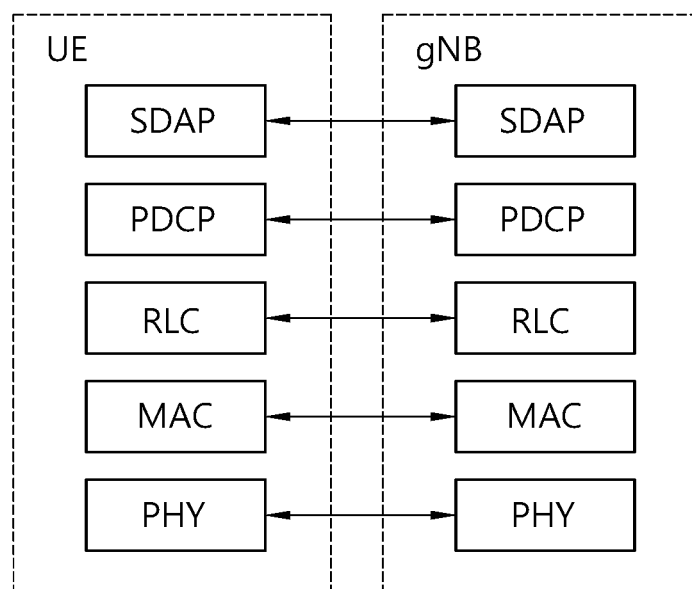
FIG. 3 shows a block diagram of a user plane protocol stack to which the technical features of the present invention can be applied.
Figure 4:
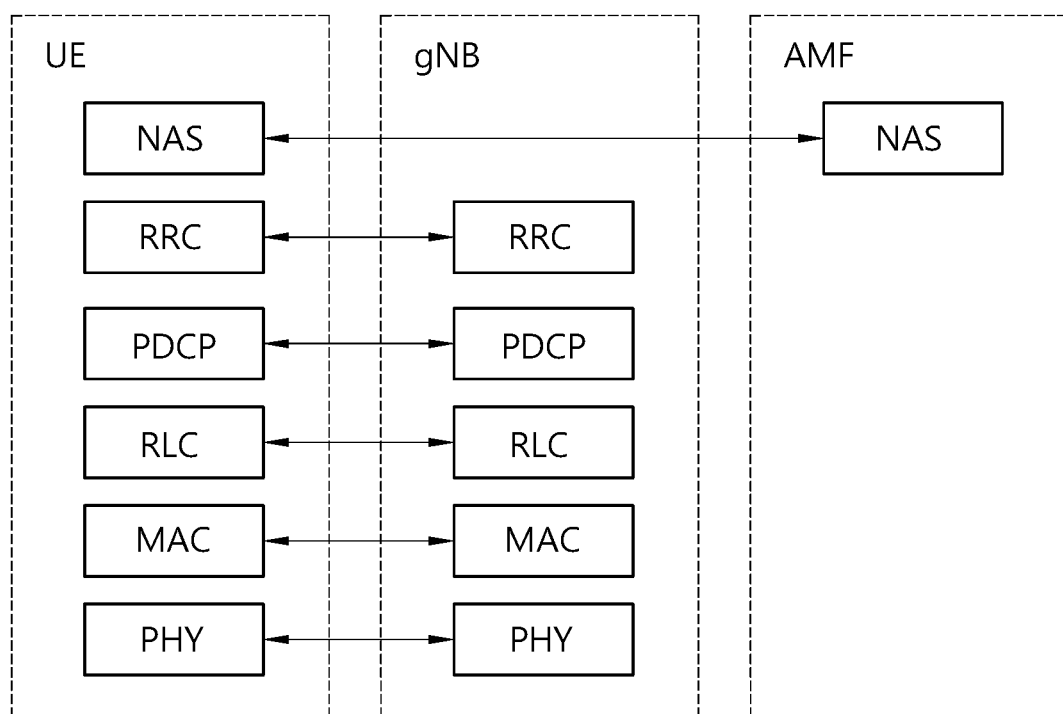
FIG. 4 shows a block diagram of a control plane protocol stack to which the technical features of the present invention can be applied.

FIG. 3 shows a block diagram of a user plane protocol stack to which the technical features of the present invention can be applied. FIG. 4 shows a block diagram of a control plane protocol stack to which the technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC CONNECTED). Otherwise, the UE is in the RRC_idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
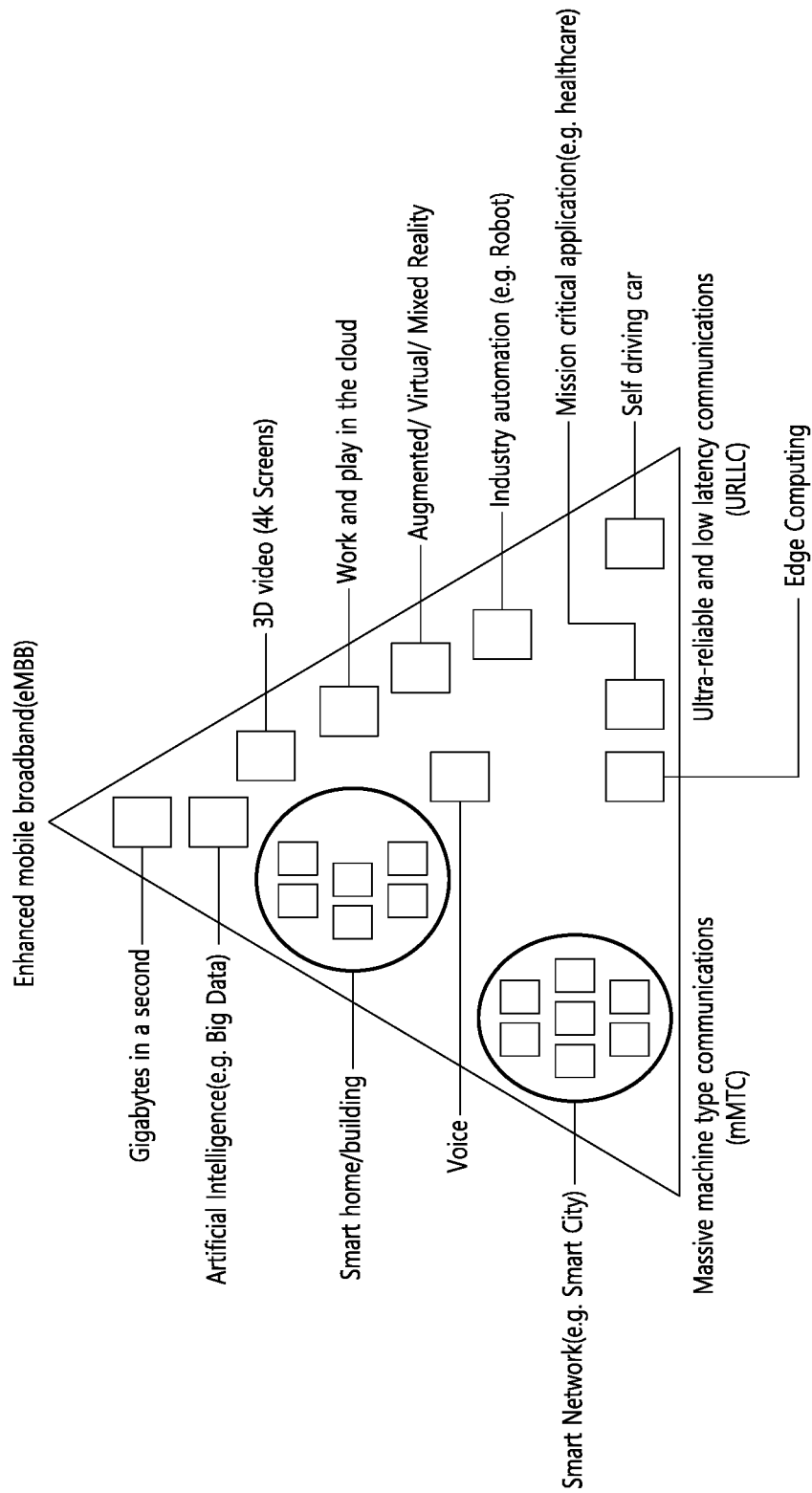
FIG. 5 shows examples of 5G usage scenarios to which the technical features of the present invention can be applied.

FIG. 5 shows examples of 5G usage scenarios to which the technical features of the present invention can be applied. The 5G usage scenarios shown in FIG. 5 are only exemplary, and the technical features of the present invention can be applied to other 5G usage scenarios which are not shown in FIG. 5.

Referring to FIG. 5, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 5 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 6:
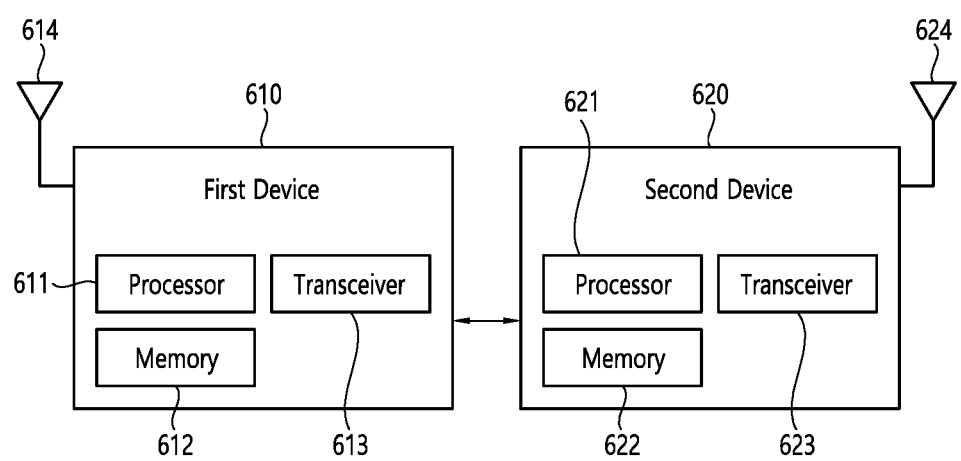
FIG. 6 shows an example of a wireless communication system to which the technical features of the present invention can be applied.

FIG. 6 shows an example of a wireless communication system to which the technical features of the present invention can be applied.

Referring to FIG. 6, the wireless communication system may include a first device 610 and a second device 620.

The first device 610 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an internet-of-things (IoT) device, a medical device, a fin-tech device (or, a financial device), a security device, a climate/environmental device, a device related to 5G services, or a device related to the fourth industrial revolution.

The second device 620 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 610 may include at least one or more processors, such as a processor 611, at least one memory, such as a memory 612, and at least one transceiver, such as a transceiver 613. The processor 611 may perform the functions, procedures, and/or methods of the present invention described below. The processor 611 may perform one or more protocols. For example, the processor 611 may perform one or more layers of the air interface protocol. The memory 612 is connected to the processor 611 and may store various types of information and/or instructions. The transceiver 613 is connected to the processor 611 and may be controlled to transmit and receive wireless signals.

The second device 620 may include at least one or more processors, such as a processor 621, at least one memory, such as a memory 622, and at least one transceiver, such as a transceiver 623. The processor 621 may perform the functions, procedures, and/or methods of the present invention described below. The processor 621 may perform one or more protocols. For example, the processor 621 may perform one or more layers of the air interface protocol. The memory 622 is connected to the processor 621 and may store various types of information and/or instructions. The transceiver 623 is connected to the processor 621 and may be controlled to transmit and receive wireless signals.

The memory 612, 622 may be connected internally or externally to the processor 611, 612, or may be connected to other processors via a variety of technologies such as wired or wireless connections.

The first device 610 and/or the second device 620 may have more than one antenna. For example, antenna 614 and/or antenna 624 may be configured to transmit and receive wireless signals.

Cell reselection evaluation process is described. It may be referred to as Section 5.2.4 of 3GPP TS 36.304 V14.6.0 (2018-03).

Reselection priorities handling is described. Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signaling, the UE shall ignore all the priorities provided in system information. If UE is in camped on any cell state, UE shall only apply the priorities provided by system information from current cell, and the UE preserves priorities provided by dedicated signaling and deprioritisationReq received in RRCConnectionReject unless specified otherwise. When the UE in camped normally state, has only dedicated priorities other than for the current frequency, the UE shall consider the current frequency to be the lowest priority frequency (i.e. lower than any of the network configured values). While the UE is camped on a suitable closed subscriber group (CSG) cell in normal coverage, the UE shall always consider the current frequency to be the highest priority frequency (i.e. higher than any of the network configured values), irrespective of any other priority value allocated to this frequency. If the UE capable of sidelink communication is configured to perform sidelink communication and can only perform the sidelink communication while camping on a frequency, the UE may consider that frequency to be the highest priority. If the UE capable of vehicle-to-everything (V2X) sidelink communication is configured to perform V2X sidelink communication and can only perform the V2X sidelink communication while camping on a frequency, the UE may consider that frequency to be the highest priority. If the UE capable of V2X sidelink communication is configured to perform V2X sidelink communication and can only use pre-configuration while not camping on a frequency, the UE may consider the frequency providing inter-carrier V2X sidelink configuration to be the highest priority. If the UE capable of sidelink discovery is configured to perform Public Safety related sidelink discovery and can only perform the Public Safety related sidelink discovery while camping on a frequency, the UE may consider that frequency to be the highest priority.

If the UE is capable either of multimedia broadcast multicast services (MBMS) service continuity or of single-cell point-to-multipoint (SC-PTM) reception and is receiving or interested to receive an MBMS service and can only receive this MBMS service while camping on a frequency on which it is provided, the UE may consider that frequency to be the highest priority during the MBMS session as long as the two following conditions are fulfilled:

1) Either:
   the UE is capable of MBMS service continuity and the reselected cell is broadcasting system information block type-13 (SIB13); or
   the UE is capable of SC-PTM reception and the reselected cell is broadcasting SIB20;
2) Either:
   SIB15 of the serving cell indicates for that frequency one or more MBMS service area identities (SAIs) included and associated with that frequency in the MBMS User Service Description (USD) of this service; or
   SIB15 is not broadcast in the serving cell and that frequency is included in the USD of this service.

If the UE is capable either of MBMS service continuity or of SC-PTM reception and is receiving or interested to receive an MBMS service provided on a downlink only MBMS frequency, on a frequency used by dedicated MBMS cells, on a frequency used by further evolved MBMS (FeMBMS)/unicast-mixed cells, or on a frequency belonging to PLMN different from its registered PLMN, the UE may consider cell reselection candidate frequencies at which it cannot receive the MBMS service to be of the lowest priority during the MBMS session, as long as the above mentioned condition 1) is fulfilled for the cell on the MBMS frequency which the UE monitors or this cell broadcasts SIB1-MBMS and as long as the above mentioned condition 2) is fulfilled for the serving cell.

Example scenarios in which the previous down-prioritization may be needed concerns the cases where camping is not possible, while the UE can only receive this MBMS frequency when camping on a subset of cell reselection candidate frequencies, e.g. the MBMS frequency is a downlink only carrier, the MBMS frequency is used by dedicated MBMS cells, the MBMS frequency is used by FeMBMS/Unicast-mixed cells, or the MBMS frequency belongs to a PLMN different from UE's registered PLMN.

If the UE is not capable of MBMS service continuity but has knowledge on which frequency an MBMS service of interest is provided, it may consider that frequency to be the highest priority during the MBMS session as long as the reselected cell is broadcasting SIB13.

If the UE is not capable of MBMS service continuity but has knowledge on which downlink only frequency, on which frequency used by dedicated MBMS cells, on which frequency used by FeMBMS/unicast-mixed cells or on which frequency belonging to PLMN different from its registered PLMN an MBMS service of interest is provided, it may consider cell reselection candidate frequencies at which it cannot receive the MBMS service to be of the lowest priority during the MBMS session as long as the cell on the MBMS frequency which the UE monitors is broadcasting SIB13 or SIB1-MBMS.

The UE considers that the MBMS session is ongoing using the session start and end times as provided by upper layers in the USD i.e. the UE does not verify if the session is indicated on MCCH.

In case UE receives RRCConnectionReject with deprioritisationReq, UE shall consider current carrier frequency and stored frequencies due to the previously received RRCConnectionReject with deprioritisationReq or all the frequencies of EUTRA to be the lowest priority frequency (i.e. lower than any of the network configured values) while T325 is running irrespective of camped RAT. The UE shall delete the stored deprioritization request(s) when a PLMN selection is performed on request by NAS.

UE should search for a higher priority layer for cell reselection as soon as possible after the change of priority. The minimum related performance requirements are still applicable.

The UE shall delete priorities provided by dedicated signaling when:
   the UE enters RRC CONNECTED state; or
   the optional validity time of dedicated priorities (T320) expires; or
   a PLMN selection is performed on request by NAS.
   Equal priorities between RATs are not supported.

The UE shall only perform cell reselection evaluation for E-UTRAN frequencies and inter-RAT frequencies that are given in system information and for which the UE has a priority provided.

The UE shall not consider any black listed cells as candidate for cell reselection.

The UE shall inherit the priorities provided by dedicated signaling and the remaining validity time (i.e., T320 in E-UTRA, T322 in UTRA and T3230 in GERAN), if configured, at inter-RAT cell (re)selection.

The network may assign dedicated cell reselection priorities for frequencies not configured by system information.

While T360 is running, redistribution target is considered to be the highest priority (i.e. higher than any of the network configured values). UE shall continue to consider the serving frequency as the highest priority until completion of E-UTRAN Inter-frequency redistribution procedure if triggered on T360 expiry/stop.

Intra-frequency and equal priority inter-frequency cell reselection criteria is described. The cell-ranking criterion $R_s$ for serving cell and $R_n$ for neighbouring cells is defined by Equation 1 below.

$$R_s = Q_{meas,s} + Q_{Hyst} - \text{Qoffset}_{temp} + \text{Qoffset}_{SCPTM}$$

$$R_n = Q_{meas,n} - \text{Qoffset} - \text{Qoffset}_{temp} + \text{Qoffset}_{SCPTM} \quad [\text{Equation 1}]$$

In Equation 1, $Q_{meas}$ is reference signal received power (RSRP) measurement quantity used in cell reselections. For intra-frequency: Qoffset equals to $\text{Qoffset}_{s,n}$, if $\text{Qoffset}_{s,n}$ is valid, otherwise this equals to zero. For inter-frequency, except for narrowband internet-of-things (NB-IoT), Qoffset equals to $\text{Qoffset}_{s,n}$ plus $\text{Qoffset}_{frequency}$, if $\text{Qoffset}_{s,n}$ is valid, otherwise this equals to $\text{Qoffset}_{frequency}$. For NB-IoT, Qoffset equals to $\text{QoffsetDedicated}_{frequency}$ for any frequency other than the frequency of the dedicated frequency offset, if $\text{QoffsetDedicated}_{frequency}$ is valid, otherwise this equals to $\text{Qoffset}_{frequency}$ (if $\text{QoffsetDedicated}_{frequency}$ is valid $\text{Qoffset}_{frequency}$ is an not used). $\text{Qoffset}_{temp}$ is offset temporarily applied to a cell. QoffsetSCPTM is an offset temporarily applied to an SC-PTM frequency. The offset is applied to all cells on the SC-PTM frequency. If $\text{Qoffset}_{SCPTM}$ is valid, Qoffset for inter-frequency neighbor cells is not used.

If the NB-IoT UE or UE in enhanced coverage is capable of SC-PTM reception and is receiving or interested to receive an MBMS service and can only receive this MBMS service while camping on a frequency on which it is provided (SC-PTM frequency), the UE considers $\text{Qoffset}_{SCPTM}$ to be valid during the MBMS session as long as the following condition is fulfilled:
   Either:
   SIB15 (or SIB15-NB) of the serving cell indicates for that frequency one or more MBMS SAIs included in the MBMS USD of this service; or
   SIB15 (or SIB15-NB) is not broadcast in the serving cell and that frequency is included in the USD of this service.

UE should search for a higher ranked cell on another frequency for cell reselection as soon as possible after the UE stops using Qoffset$_{SCPTM}$.

The UE shall perform ranking of all cells that fulfil the cell selection criterion S, but may exclude all CSG cells that are known by the UE not to be CSG member cells.

The cells shall be ranked according to the R criteria specified above, deriving Q$_{meas,n}$ and Q$_{meas,s}$ and calculating the R values using averaged RSRP results.

If a cell is ranked as the best cell, the UE shall perform cell reselection to that cell.

In all cases, the UE shall reselect the new cell, only if the following conditions are met:
  the new cell is better ranked than the serving cell during a time interval Treselection$_{RAT}$;
  more than 1 second has elapsed since the UE camped on the current serving cell.

When the UE uses infinite dBs for Qoffset$_{SCPTM}$, the UE shall use Qoffset$_{SCPTM}$ zero and rank the cells on the SC-PTM frequency(ies) only first. If the UE cannot find a suitable cell on an SC-PTM frequency, the UE shall rank the cells on all frequencies.

Cell reservations and access restrictions are described. It may be referred to as Section 5.3 of 3GPP TS 36.304 V14.6.0 (2018-03).

There are two mechanisms which allow an operator to impose cell reservations or access restrictions. The first mechanism uses indication of cell status and special reservations for control of cell selection and reselection procedures. The second mechanism, referred to as access control, shall allow preventing selected classes of users or application specific congestion control for Data communication (ACDC) categories from sending initial access messages for load control reasons. For access control based on access classes, at subscription, one or more access classes are allocated to the subscriber and stored in the universal subscription identification module (USIM). For access control based on ACDC categories, at subscription at least four ACDC categories are allocated to the subscriber and stored in the ACDC management object (MO) or USIM.

Cell status and cell reservations are described. Cell status and cell reservations are indicated in the SystemInformationBlockType1 message (or SystemInformationBlockType1-BR message or SystemInformationBlockType1-NB message) by means of two fields:
  cellBarred (IE type: "barred" or "not barred"): In case of multiple PLMNs indicated in SIB1, this field is common for all PLMNs
  cellReservedForOperatorUse (IE type: "reserved" or "not reserved"): In case of multiple PLMNs indicated in SIB1, this field is specified per PLMN.

When cell status is indicated as "not barred" and "not reserved" for operator use, all UEs shall treat this cell as candidate during the cell selection and cell reselection procedures.

When cell status is indicated as "not barred" and "reserved" for operator use for any PLMN,
  UEs assigned to access class 11 or 15 operating in their home PLMN (HPLMN)/equivalent HPLMN (EHPLMN) shall treat this cell as candidate during the cell selection and reselection procedures if the field cellReservedForOperatorUse for that PLMN set to "reserved".
  UEs assigned to an access class in the range of 0 to 9, 12 to 14 shall behave as if the cell status is "barred" in case the cell is "reserved for operator use" for the registered PLMN or the selected PLMN.

Access classes 11, 15 are only valid for use in the HPLMN/EHPLMN, and access classes 12, 13, 14 are only valid for use in the home country.

When cell status "barred" is indicated or to be treated as if the cell status is "barred",
  1> The UE is not permitted to select/reselect this cell, not even for emergency calls.
  1> The UE shall select another cell according to the following rule:
    1> If the cell is to be treated as if the cell status is "barred" due to being unable to acquire the MasterInformationBlock (or MasterInformationBlock-NB), the SystemInformationBlockType1 (or SystemInformationBlockType1-BR message or SystemInformationBlockType1-NB), or the SystemInformationBlockType2 (or SystemInformationBlockType2-NB):
      2> the UE may exclude the barred cell as a candidate for cell selection/reselection for up to 300 seconds.
      2> the UE may select another cell on the same frequency if the selection criteria are fulfilled.
      2> the UE may select the same cell in normal coverage if the UE was barred in the cell due to being unable to acquire MasterInformationBlock, SystemInformationBlockType1-BR, or SystemInformationBlockType2 in enhanced coverage, but was able to acquire MasterInformationBlock, SystemInformationBlockType1, and SystemInformationBlockType2 in normal coverage, if the selection criteria are fulfilled.
    1> else
    2> If the cell is a CSG cell:
      3> the UE may select another cell on the same frequency if the selection/reselection criteria are fulfilled.
    2> else
      3> If the field intraFreqReselection in field cellAccessRelatedInfo in SystemInformationBlockType1 (or SystemInformationBlockType1-BR message or SystemInformationBlockType1-NB) message is set to "allowed", the UE may select another cell on the same frequency if re-selection criteria are fulfilled.
      4> The UE shall exclude the barred cell as a candidate for cell selection/reselection for 300 seconds.
      3> If the field intraFreqReselection in field cellAccessRelatedInfo in SystemInformationBlockType1 (or SystemInformationBlockType1-BR message or SystemInformationBlockType1-NB) message is set to "not allowed" the UE shall not re-select a cell on the same frequency as the barred cell;
      4> The UE shall exclude the barred cell and the cells on the same frequency as a candidate for cell selection/reselection for 300 seconds.

The cell selection of another cell may also include a change of RAT.

Access control is described. Information on cell access restrictions associated with the access classes or ACDC categories is broadcast as system information. The UE shall ignore access class or ACDC category related cell access restrictions when selecting a cell to camp on, i.e. it shall not reject a cell for camping on because access on that cell is not allowed for any of the access classes or ACDC categories of the UE. A change of the indicated access restriction shall not trigger cell reselection by the UE. Access class or ACDC category related cell access restrictions shall be checked by the UE when starting RRC connection establishment procedure.

NR standalone operation on unlicensed bands is described. NR standalone operation on unlicensed band is now studied. In LTE LAA, a cell on an unlicensed band is not considered as primary cell (PCell), but only as secondary cell (SCell). On the other hand, In NR standalone operation on unlicensed bands, a cell on an unlicensed band can be considered as a PCell. Therefore, initial access and/or random access procedure should be newly considered in the cell on the unlicensed band.

For initial access procedure on unlicensed bands, synchronization signal (SS)/physical broadcast channel (PBCH) block can be transmitted on unlicensed bands. However, SS/PBCH transmission on unlicensed bands may be subject to listen-before-talk (LBT) and occupied channel bandwidth (OCB) requirement. And the current design of NR SS/PBCH block on licensed bands may not be fully reused. Therefore, NR SS/PBCH block for licensed band operation should be revisited by taking LBT and OCB into consideration for NR standalone unlicensed band operation.

For random access procedure on unlicensed bands, RACH preamble design for unlicensed band operation mostly target smaller cell ranges than those for licensed band operation. LBT may lead to degraded RA performance. Specific design of PRACH waveform may be required to fulfil the OCB requirement. Therefore, design of RACH preamble and procedure for unlicensed band operation should take the supported cell range and the impact of LBT as well as the requirement of OCB into consideration.

As described above, LBT and/or OCB requirements should be considered for NR standalone operation on unlicensed bands. Meanwhile, it may be discussed to consider UE preference for NR standalone operation on unlicensed bands. For example, if LBT is failed on the unlicensed band, the UE and/or BS may wait until the back-off timer is expired, and may continuously retry the LBT according to convention LAA. If the UE prefers free service rather than low latency, it would be reasonable to remain on the unlicensed band. However, if the UE prefer low latency rather than free service, it would be better the UE to reselect the licensed band, because the service on the unlicensed band can be delayed with high probability due to LBT failure.

Figure 7:
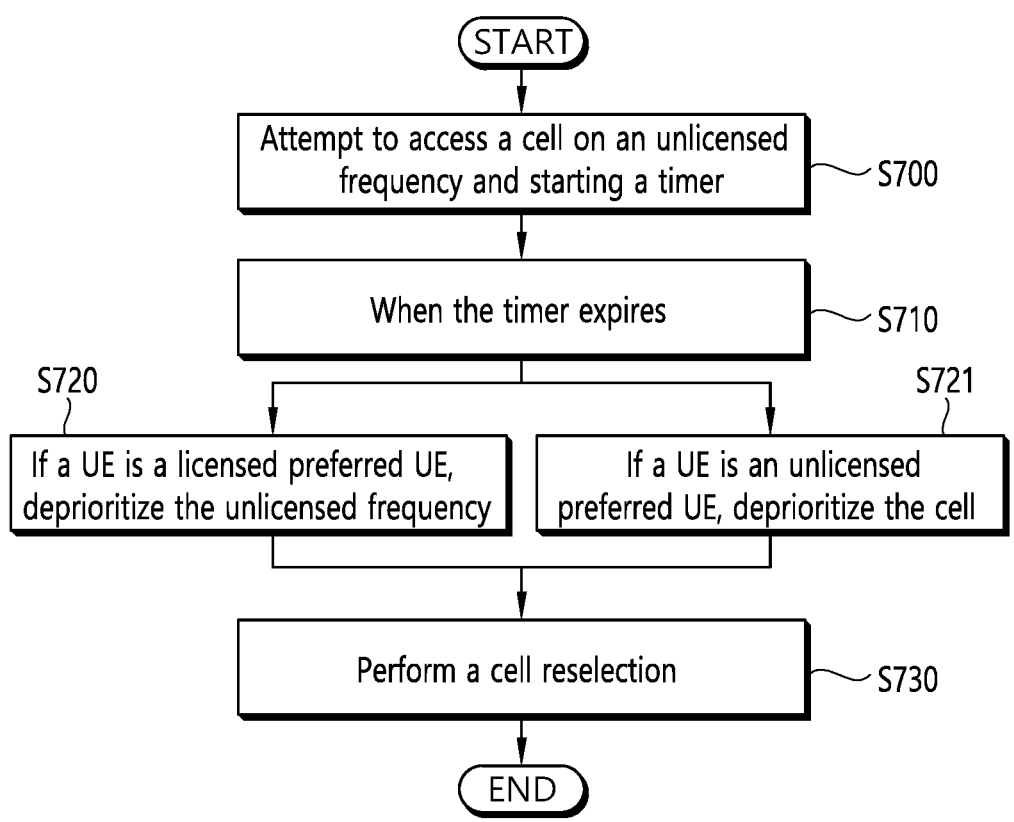
FIG. 7 shows an example of a method for deprioritizing access on an unlicensed band based on UE preference according to an embodiment of the present invention.

FIG. 7 shows an example of a method for deprioritizing access on an unlicensed band based on UE preference according to an embodiment of the present invention. According to the embodiment of the present invention, the UE deprioritize the frequency or cell based on the preference of the UE.

In step S700, the UE attempts to access a cell on an unlicensed frequency and starting a timer. The UE may be in RRC_IDLE and/or RRC_INACTIVE. Attempting to access may include performing LBT on the unlicensed frequency. An indication from the cell or a neighbor cell may indicate the unlicensed frequency. That is, if the cell or neighbor cell broadcasts the indication indicating the unlicensed frequency, the UE may consider the frequency of the cell as the unlicensed frequency. The access may be for RRC connection request and/or an RRC resume request.

In step S710, the timer expires. The timer may expire when the LBT is failed multiple times.

In step S720, if the UE is a licensed preferred UE, the UE deprioritizes the unlicensed frequency. In step S721, if the UE is an unlicensed preferred UE, the UE deprioritizes the cell. More specifically, if the UE is a licensed preferred UE, the UE may determine a priority of the unlicensed frequency for the cell reselection as a lowest priority in order to deprioritize the unlicensed frequency. More specifically, if the UE is an unlicensed preferred UE, the UE may apply Qoffsettemp to the cell for the cell reselection in order to deprioritize the cell on the unlicensed frequency. That is, the UE may deprioritize only the cell on the unlicensed frequency, not all cells on the unlicensed frequency.

Alternatively, if the timer expires and if the UE attempts access to a cell on a licensed frequency, the UE may deprioritize the cell.

The UE may transmit information about whether the UE is either the licensed preferred UE or the unlicensed preferred UE to a network. The UE may request from a network whether the UE is either the licensed preferred UE or the unlicensed preferred UE. That is, the UE may report and/or request the preference of the UE to the network. The report and/or request may be transmitted through NAS registration request message. Whether the UE is either the licensed preferred UE or the unlicensed preferred UE may be determined based on a network configuration. That is, UE may decide the UE preference according to the network configuration.

In step S730, the UE performs a cell reselection according to de-prioritization for the unlicensed frequency and/or for the cell performed at steps S720 and/or S721.

According to embodiment of the present invention shown in FIG. 7, the UE preference on the unlicensed frequency and/or licensed frequency can be considered for cell reselection. Therefore, when LBT failure occurs several times on the unlicensed frequency, the UE can deprioritize the whole unlicensed carrier and/or only the cell on the unlicensed frequency at which the UE attempts to access based on the UE preference. Consequently, the UE can perform cell reselection appropriately.

Various examples of the present invention are described.

(1) Example 1: Unlicensed Frequency and Licensed Preferred UE

Figure 8:
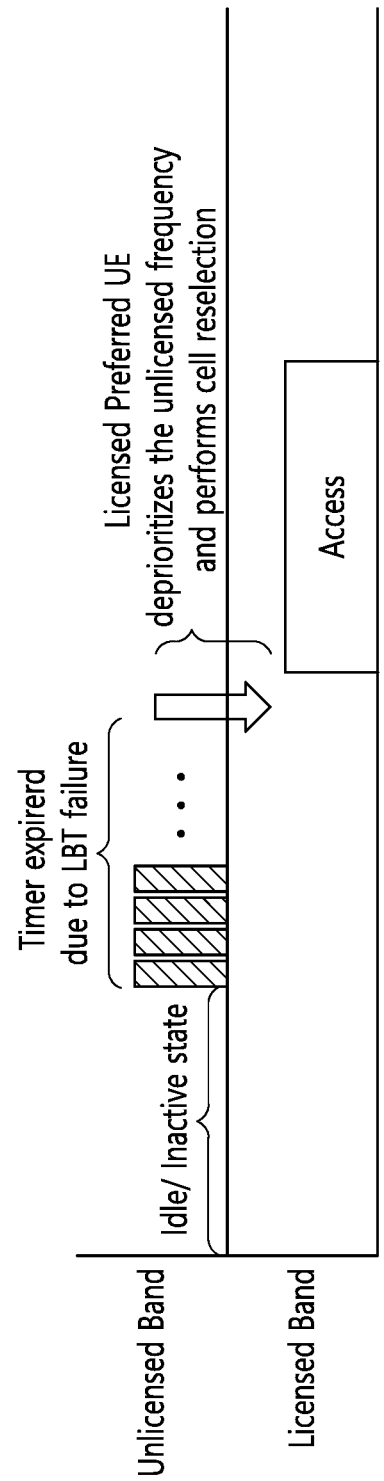
FIG. 8 shows an example of a licensed preferred UE behavior on an unlicensed frequency according to an embodiment of the present invention.

FIG. 8 shows an example of a licensed preferred UE behavior on an unlicensed frequency according to an embodiment of the present invention.

The delay due to the LBT failure should be considered especially PCell or primary SCell (PSCell) on unlicensed band. The UE using voice call service or URLLC service may camp on unlicensed band due to load balancing. However, if LBT of the UE continuously failed, the service would be delayed and quality would be getting worse. In legacy LTE, the UE should continuously retry LBT with random back-off timer. However, in legacy LTE, the unlicensed band is only configured for SCell. So, the data can be transmitted via PCell on the licensed band even if LBT was continuously failed. However, the NR considers PCell or PSCell on unlicensed band. Especially, the UE camped on NR standalone cell on the unlicensed band may continuously retry LBT until the LBT is successful, which may lead that the service continuously delayed.

Therefore, the licensed preferred UE should deprioritize the unlicensed band when LBT is failed several times. The licensed preferred UE may use voice call service or URLLC service. The network may configure the licensed preferred indication based on the UE supported services with NAS registration message. Even if the UE supports voice call service or URLLC, the UE may prefer the unlicensed band for free. For the case, the UE may report its preference for the unlicensed band to the network via NAS registration message. The licensed preferred UE may start a timer when the UE is in RRC_IDLE and/or RRC_INACTIVE and the UE performs LBT to attempt access for RRC connection request and/or RRC resume request. The UE deprioritize the unlicensed frequency as the lowest priority when the timer is expired due to the several LBT failures. The UE performs cell reselection based on the deprioritized unlicensed frequency.

(2) Example 2: Unlicensed Frequency and Unlicensed Preferred UE

Figure 9:
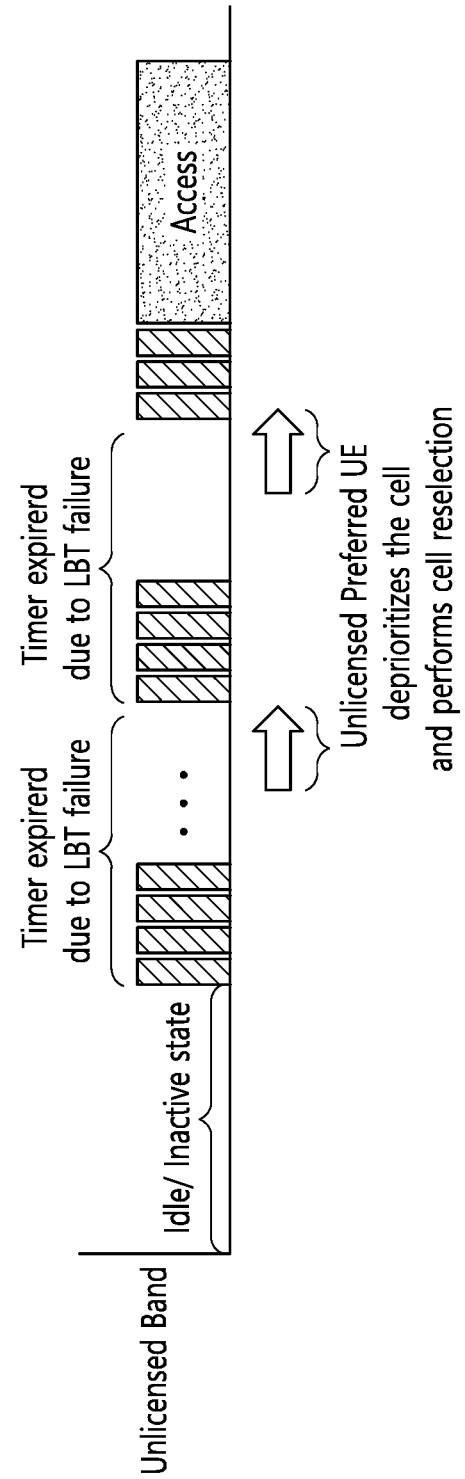
FIG. 9 shows an example of an unlicensed preferred UE behavior on an unlicensed frequency according to an embodiment of the present invention.

FIG. 9 shows an example of an unlicensed preferred UE behavior on an unlicensed frequency according to an embodiment of the present invention.

Even if the services are delayed, some UEs may prefer the unlicensed band. For example, mMTC and public services (e.g. airport, bus stop) prefer the free services. In this case, the network may configure the unlicensed preferred indication based on the UE supported services with NAS registration message. Even if the UE supports the URLLC, the UE may prefer the unlicensed band for free. For example, many robots in industry using URLLC service may need free service for reducing the cost. The factory would try to be isolated from the urban to avoid the interference. However, it is not easy to eliminate all interference.

So, the unlicensed preferred UE in RRC_IDLE and/or RRC_INACTIVE may perform LBT to attempt to access for RRC connection request and/or RRC resume request and start a timer. Even if the LBT is failed until the timer expired, unlicensed preferred UE may want to remain on the unlicensed band for free. Therefore, the UE applies Qoffsettemp only to the cell for de-prioritization and performs cell reselection based on deprioritized cell. Not only the LBT failure but also the RACH failure may cause expiry of the timer. In this case, the UE may also deprioritize the cell and perform cell reselection based on the deprioritized cell.

(3) Licensed Frequency

The UE starts a timer (e.g. T300) when the UE attempts to access for RRC connection request and/or RRC resume request. If the timer expires due to the lower layer failure (e.g. RACH failure), the UE applies Qoffsettemp to the cell for de-prioritization and performs cell reselection. If the cell could not receive access attempt by the UE and/or the cell could not send the response because of a remote radio antenna (RRH) failure, the UE may be served successfully in other cell. Therefore, the UE deprioritizes the cell and performs cell reselection based on the deprioritized cell.

Figure 10:
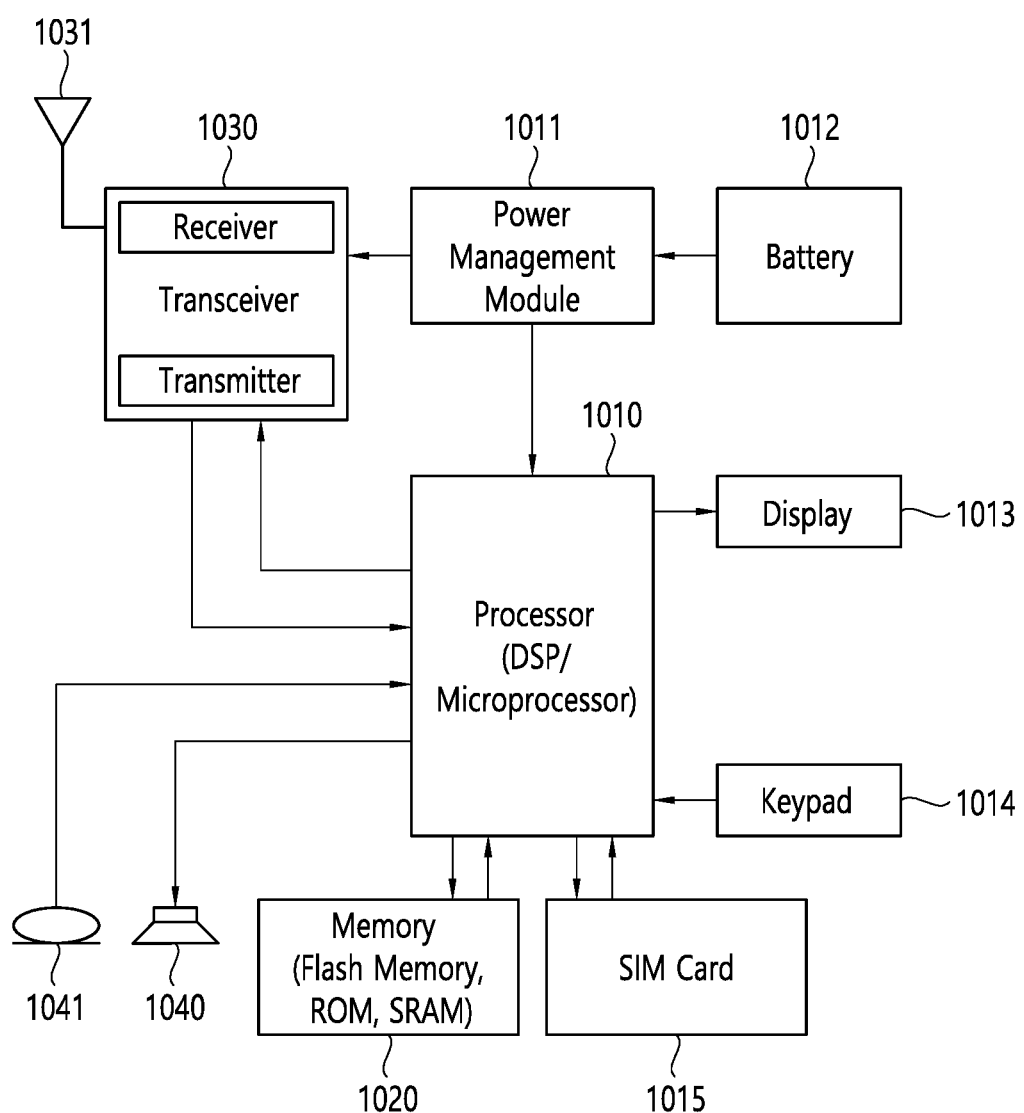
FIG. 10 shows a UE to implement an embodiment of the present invention.

FIG. 10 shows a UE to implement an embodiment of the present invention. The present invention described above for UE side may be applied to this embodiment.

A UE includes a processor 1010, a power management module 1011, a battery 1012, a display 1013, a keypad 1014, a subscriber identification module (SIM) card 1015, a memory 1020, a transceiver 1030, one or more antennas 1031, a speaker 1040, and a microphone 1041.

The processor 1010 may be configured to implement proposed functions, procedures and/or methods described in this description. Layers of the radio interface protocol may be implemented in the processor 1010. The processor 1010 may include application-specific integrated circuit (ASIC), other chipset, logic circuit and/or data processing device. The processor 1010 may be an application processor (AP). The processor 1010 may include at least one of a digital signal processor (DSP), a central processing unit (CPU), a graphics processing unit (GPU), a modem (modulator and demodulator). An example of the processor 1010 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1010 may be configured to attempt to access a cell on an unlicensed frequency and may be configure to start a timer. The UE may be in RRC_IDLE and/or RRC_INACTIVE. Attempting to access may include performing LBT on the unlicensed frequency. An indication from the cell or a neighbor cell may indicate the unlicensed frequency. That is, if the cell or neighbor cell broadcasts the indication indicating the unlicensed frequency, the UE may consider the frequency of the cell as the unlicensed frequency. The access may be for RRC connection request and/or an RRC resume request.

The timer expires. The timer may expire when the LBT is failed multiple times. If the UE is a licensed preferred UE, the processor 1010 may be configured to deprioritize the unlicensed frequency. Alternatively, if the UE is an unlicensed preferred UE, the processor 1010 may be configured to deprioritize the cell. More specifically, if the UE is a licensed preferred UE, the processor 1010 may be configured to determine a priority of the unlicensed frequency for the cell reselection as a lowest priority in order to deprioritize the unlicensed frequency. More specifically, if the UE is an unlicensed preferred UE, the processor 1010 may be configured to apply Qoffsettemp to the cell for the cell reselection in order to deprioritize the cell on the unlicensed frequency. That is, the processor 1010 may be configured to deprioritize only the cell on the unlicensed frequency, not all cells on the unlicensed frequency.

Alternatively, if the timer expires and if the UE attempts access to a cell on a licensed frequency, the processor 1010 may be configured to deprioritize the cell.

The processor 1010 may be configured to control the transceiver 1030 to transmit information about whether the UE is either the licensed preferred UE or the unlicensed preferred UE to a network. The processor 1010 may be configured to control the transceiver 1030 to request from a network whether the UE is either the licensed preferred UE or the unlicensed preferred UE. That is, the processor 1010 may be configured to control the transceiver 1030 to report and/or request the preference of the UE to the network. The report and/or request may be transmitted through NAS registration request message. Whether the UE is either the licensed preferred UE or the unlicensed preferred UE may be determined based on a network configuration. That is, the processor 1010 may be configured to decide the UE preference according to the network configuration.

The processor 1010 may be configured to perform a cell reselection according to de-prioritization for the unlicensed frequency and/or for the cell.

The power management module 1011 manages power for the processor 1010 and/or the transceiver 1030. The battery 1012 supplies power to the power management module 1011. The display 1013 outputs results processed by the processor 1010. The keypad 1014 receives inputs to be used by the processor 1010. The keypad 1014 may be shown on the display 1013. The SIM card 1015 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1020 is operatively coupled with the processor 1010 and stores a variety of information to operate the processor 1010. The memory 1020 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

The transceiver 1030 is operatively coupled with the processor 1010, and transmits and/or receives a radio signal. The transceiver 1030 includes a transmitter and a receiver. The transceiver 1030 may include baseband circuitry to process radio frequency signals. The transceiver 1030 controls the one or more antennas 1031 to transmit and/or receive a radio signal.

The speaker 1040 outputs sound-related results processed by the processor 1010. The microphone 1041 receives sound-related inputs to be used by the processor 1010.

According to embodiment of the present invention shown in FIG. 10, the UE preference on the unlicensed frequency and/or licensed frequency can be considered for cell reselection. Therefore, when LBT failure occurs several times on the unlicensed frequency, the UE can deprioritize the whole unlicensed carrier and/or only the cell on the unlicensed frequency at which the UE attempts to access based on the UE preference. Consequently, the UE can perform cell reselection appropriately.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a wireless device in a wireless communication system, the method comprising:
    initiating a listen-before-talk (LBT) procedure, for accessing to a cell on an unlicensed frequency, and starting a timer,
    wherein the cell comprises at least one of a primary cell (PCell) or a primary secondary cell (PSCell);
    performing the LBT procedure while the timer is running; and
    upon an expiry of the timer with the LBT procedure failed, performing a cell reselection based on information for a user equipment (UE) preference received from a network,
    wherein the UE preference informs whether the wireless device is a licensed preferred wireless device or an unlicensed preferred wireless device, and
    wherein the performing of the cell reselection comprises:
        based on the UE preference informing that the wireless device is the licensed preferred wireless device, performing a cell reselection to another cell on a licensed frequency by setting a priority of the unlicensed frequency as a lowest priority; and
        based on the UE preference informing that the wireless device is the unlicensed preferred wireless device, performing a cell reselection to another cell on the unlicensed frequency by setting a ranking of the cell on the unlicensed frequency to be lowered.

2. The method of claim 1, wherein the setting of the ranking of the cell on the unlicensed frequency to be lowered comprises applying Qoffsettemp to the cell for the cell reselection.

3. The method of claim 1, wherein an indication from the cell or a neighbor cell indicates the unlicensed frequency.

4. The method of claim 1, wherein the accessing to the cell comprises transmitting a radio resource control (RRC) connection request or an RRC resume request to the cell.

5. The method of claim 1, wherein the wireless device is in communication with at least one of a user equipment, a network, or autonomous vehicles other than the wireless device.

6. A wireless device in a wireless communication system, the wireless device comprising:
    a memory;
    a transceiver; and
    a processor, operably coupled to the memory and the transceiver, and configured to:
        initiate a listen-before-talk (LBT) procedure, for accessing to a cell on an unlicensed frequency, and start a timer,
        wherein the cell comprises at least one of a primary cell (PCell) or a primary secondary cell (PSCell);
        perform the LBT procedure while the timer is running; and
        upon an expiry of the timer with the LBT procedure failed, perform a cell reselection based on information for a user equipment (UE) preference received from a network,
        wherein the UE preference informs whether the wireless device is a licensed preferred wireless device or an unlicensed preferred wireless device, and
        wherein the processor is further configured to:
            based on the UE preference informing that the wireless device is the licensed preferred wireless device, perform a cell reselection to another cell on a licensed frequency by setting a priority of the unlicensed frequency as a lowest priority; and
            based on the UE preference informing that the wireless device is the unlicensed preferred wireless device, perform a cell reselection to another cell on the unlicensed frequency by setting a ranking of the cell on the unlicensed frequency to be lowered.

7. The wireless device of claim 6, wherein the setting of the ranking of the cell on the unlicensed frequency to be lowered comprises applying Qoffsettemp to the cell for the cell reselection.

8. A processor for a wireless device in a wireless communication system, wherein the processor is configured to:
    initiate a listen-before-talk (LBT) procedure, for accessing to a cell on an unlicensed frequency, and start a timer,
    wherein the cell comprises at least one of a primary cell (PCell) or a primary secondary cell (PSCell);
    perform the LBT procedure while the timer is running; and
    upon an expiry of the timer with the LBT procedure failed, perform a cell reselection based on information for a user equipment (UE) preference received from a network, wherein the UE preference informs whether the wireless device is a licensed preferred wireless device or an unlicensed preferred wireless device, and wherein the processor is further configured to:
- based on the UE preference informing that the wireless device is the licensed preferred wireless device, perform a cell reselection to another cell on a licensed frequency by setting a priority of the unlicensed frequency as a lowest priority; and
- based on the UE preference informing that the wireless device is the unlicensed preferred wireless device, perform a cell reselection to another cell on the unlicensed frequency by setting a ranking of the cell on the unlicensed frequency to be lowered.

* * * * *